United States Patent [19]
Ellgen

[11] Patent Number: 5,162,166
[45] Date of Patent: Nov. 10, 1992

[54] DEVICES PROVIDING ELECTRICAL ENERGY FROM FUEL/OXYGEN MIXTURES

[75] Inventor: Paul C. Ellgen, Oklahoma City, Okla.

[73] Assignee: Kerr-McGee Corporation, Oklahoma City, Okla.

[21] Appl. No.: 732,896

[22] Filed: Jul. 19, 1991

[51] Int. Cl.⁵ .............................................. H01M 8/10
[52] U.S. Cl. ...................................... 429/30; 429/40; 429/44
[58] Field of Search ............... 429/30, 40, 44, 101, 429/12

[56] References Cited

U.S. PATENT DOCUMENTS

| | | | |
|---|---|---|---|
| 3,368,922 | 2/1968 | Salyer | 136/86 |
| 4,297,184 | 10/1981 | Dyer | 204/129.4 |
| 4,470,894 | 9/1984 | Dyer | 204/129 |
| 4,537,840 | 8/1985 | Tsukui et al. | 429/33 |
| 4,539,276 | 9/1985 | Harbach | 429/191 |
| 4,540,476 | 9/1985 | Dyer | 204/96 |
| 4,680,241 | 7/1987 | Dyer | 429/49 |
| 4,772,458 | 9/1988 | Gosser et al. | 423/584 |
| 4,832,938 | 5/1989 | Gosser et al. | 423/584 |
| 4,863,813 | 9/1989 | Dyer | 429/33 |
| 4,894,301 | 1/1990 | Dyer | 429/193 |

OTHER PUBLICATIONS

Dyer. "A Novel Thin-Film Electrochemical Device for Energy Conversion", Nature, vol. 343, Feb. 8, 1990.
Mallouk. "A Mineaturized Electrochemistry", Nature, vol. 343, Feb. 8, 1990, pp. 515–516.
Technology Newsletter-Bellcore Fuel Cell, Chemical Week, Mar. 7, 1990, p. 29.
Pool. "Electricity by Serendipity", Science, vol. 247, Mar. 2, 1990, pp. 1034–1035.
Gottesfeld. "Thin Film Fuel Cells", Nature, vol. 345, Jun. 21, 1990, p. 673.

Primary Examiner—Anthony Skapars
Attorney, Agent, or Firm—Herbert M. Hanegan

[57] ABSTRACT

The present invention provides improved devices for the production of electrical energy from mixtures of oxygen (i.e., pure oxygen, air, or a similar source of free oxygen) and fuel (i.e., hydrogen and/or a hydrogen-yielding fuel). The devices generally comprise: a first electrode means for receiving electrons; a second electrode means for supplying electrons; and an electrolytic diffusion means, positioned between the two electrode means, for conducting ions from one electrode means to the other electrode means and for conducting oxygen and fuel, oxygen and hydrogen, or oxygen and a combination of fuel and hydrogen from one electrode means to the other electrode means (FIG. 1). At least one of the electrode means is permeable. Additionally, the first electrode means comprises a catalytic material which is a highly active catalyst for the formation of $H_2O_2$ from $H_2$ and $O_2$.

26 Claims, 1 Drawing Sheet

DEVICES PROVIDING ELECTRICAL ENERGY FROM FUEL/OXYGEN MIXTURES

BACKGROUND OF THE INVENTION

1. Field of the Invention

The present invention relates to devices for producing electrical energy from mixtures of fuel (i.e., hydrogen and/or hydrogen-yielding fuel) and oxygen.

2. Description of the Prior Art

U.S. Pat. No. 4,863,813, issued to Dyer, discloses a solid electrolyte fuel cell capable of producing electrical current when exposed to an oxygen/hydrogen, oxygen/methane, or oxygen/methanol feed mixture. The fuel cell has a permeable outer electrode and an impermeable inner electrode. The electrodes are separated by an electron insulating, ion conducting, gas permeable solid electrolyte. The electrodes catalyze electrochemical half cell reactions which produce a surplus of electrons at one electrode and consume electrons at the other electrode. The inner electrode and the outer electrode of the Dyer fuel cell can consist of platinum, palladium, or an undefined alloy of platinum and palladium. Other suitable electrode materials include gold, nickel, and nonmetals such as electrically conducting mixed oxides with spinel or perovskite structure.

Although the Dyer device has been used to produce electrical energy from the fuel/oxygen mixtures mentioned above, the nature of the processes which causes the Dyer device to operate have heretofore been unknown. U.S. Pat. No. 4,863,813 states only that (1) the Dyer device depends for its operation on the ability to maintain different fuel:oxidizer ratios at the two electrodes and (2) these fuel/oxidizer concentration differences result from the differential diffusion of fuel and oxidizer through the permeable electrolyte. However, as explained hereinbelow, the Dyer device also depends for its operation on certain non-electrochemical reactions.

SUMMARY OF THE INVENTION

The present invention provides improved devices for producing electrical energy from mixtures of fuel (i.e., hydrogen, hydrogen-yielding fuel, or mixtures thereof) and oxygen (i.e., pure oxygen, air, or a similar free oxygen source) As discussed hereinbelow, I have discovered that mixed oxygen/hydrogen fuel cell-type devices operate primarily through (1) the chemical formation of hydrogen peroxide and (2) the occurrence of certain electrochemical half cell reactions which produce a surplus of electrons at one electrode and consume electrons at the other electrode In one aspect, the devices of the present invention achieve improved electrical energy output through the enhancement of one or more of these chemical and/or electrochemical processes.

In one embodiment, the present invention provides a device comprising: a first electrode means for receiving electrons; a second electrode means for supplying electrons; and an electrolytic diffusion means, positioned between the first electrode means and the second electrode means, for conducting ions from one electrode means to the other electrode means and for conducting oxygen and fuel, oxygen and hydrogen, or oxygen and a combination of fuel and hydrogen from one electrode means to the other electrode means. At least one of the electrode means is permeable. The first electrode means is comprised of a catalytic material which is a highly active catalyst for the formation of $H_2O_2$ from $H_2$ and $O_2$. The second electrode means, on the other hand, is less catalytically active than the first electrode means for the formation of $H_2O_2$ from $H_2$ and $O_2$.

In another embodiment, the present invention provides a device comprising: a first electrode; a second electrode; an electrolytic diffusion means, positioned between the electrodes, for conducting ions from one electrode to the other electrode and for conducting oxygen and fuel, oxygen and hydrogen, or oxygen and a combination of fuel and hydrogen from one electrode to the other electrode; and a layer of promoter material adjacent to the second electrode. At least one of the electrodes is permeable. The promoter material is a promoter of the formation of hydrogen peroxide. Preferably, the second electrode is more catalytically active than the first electrode for the formation of hydrogen peroxide from hydrogen and oxygen.

In another embodiment, the present invention provides a device comprising: a permeable first electrode; a second electrode having a first surface and a second surface; an electrolytic diffusion means, positioned between the electrodes, for conducting ions from one electrode to the other electrode and for conducting oxygen and fuel, oxygen and hydrogen, or oxygen and a combination of fuel and hydrogen from one electrode to the other electrode; and a catalytic means, adjacent to one of the surfaces of the second electrode, for catalyzing the formation of $H_2O_2$ from $H_2$ and $O_2$. The catalytic means preferably comprises a layer of a permeable inert material having a catalytic material dispersed therein. The catalytic material used in the catalytic means is a material which is active for the formation of $H_2O_2$ from $H_2$ and $O_2$.

Electrochemical devices capable of producing electrical energy from mixtures of fuel and oxygen provide several advantages over conventional fuel cells which require fuel and oxygen segregation. Mixed fuel/oxygen devices can be manufactured using thin film fabrication techniques and can thus be used advantageously in planar technologies for such items as semi-conductor integrated circuits. A plurality of mixed fuel/oxygen devices can be connected in series to provide a power source of desired voltage. Mixed fuel/oxygen devices can also be used, for example, as gas sensors which generate their own electrical energy and do not require continuous application of externally generated power. Further, mixed fuel/oxygen devices can be operated using unseparated gases.

Further objects, features, and advantages of the present invention will readily appear to those skilled in the art upon reference to the drawings and upon reading the following description of the preferred embodiments.

DESCRIPTION OF THE PREFERRED EMBODIMENTS

Figure 1:
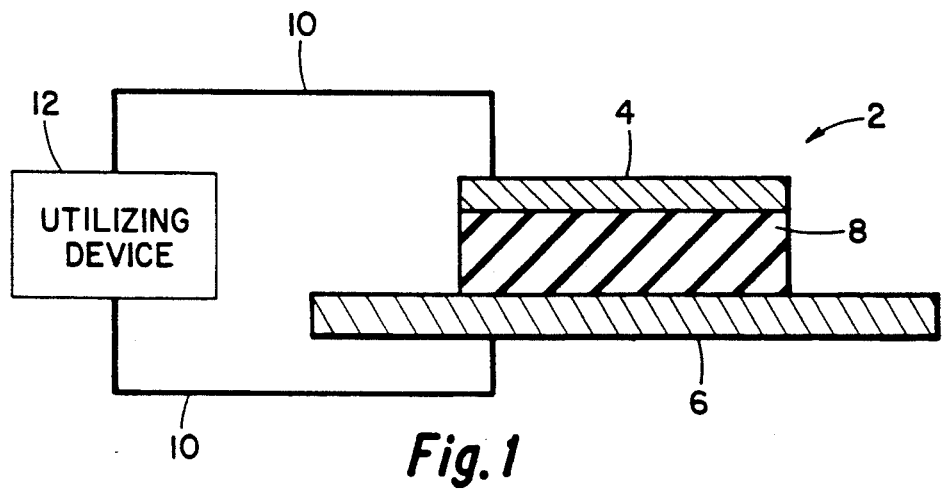
FIG. 1 is a diagram of one embodiment of the device of the present invention.

Electrical energy production in a mixed fuel/oxygen device of the type described in U.S. Pat. No. 4,863,813 results primarily from a combination of chemical reactions and electrochemical half cell reactions. As discussed hereinabove, the mixed fuel/oxygen device of U.S. Pat. No. 4,863,813 consists of: a permeable outer electrode; an impermeable inner electrode; and a layer of permeable, ion-conducting, electron insulating electrolyte material positioned between the outer electrode and the inner electrode. When the porous outer electrode of the device is contacted with a mixture of hydrogen and oxygen, a portion of the hydrogen decomposes at the outer electrode according to electrochemical half cell reaction (1) to produce electrons and positively charged hydrogen ions.

$$H_2 \rightarrow 2H^+ + 2e \qquad (1)$$

A second portion of the hydrogen and a portion of the oxygen diffuse through both the permeable outer electrode and the permeable electrolyte layer and react catalytically at the inner electrode according to reaction (2) to form hydrogen peroxide.

$$H_2 + O_2 \rightarrow H_2O_2 \qquad (2)$$

The hydrogen ions produced at the outer electrode diffuse to the inner electrode by way of the electrolyte layer. Since the electrolyte material is electron insulating, the electrons produced at the outer electrode are conducted to the inner electrode by way of an external conducting circuit. Upon arriving at the inner electrode, the electrons and hydrogen ions react electrochemically with hydrogen peroxide according to half cell reaction (3) to produce water.

$$H_2O_2 + 2H^+ + 2e \rightarrow 2H_2O \qquad (3)$$

Although each of the above-mentioned reactions occurs to some extent at both electrodes, the platinum or palladium electrode devices of U.S. Pat. No. 4,863,813 operate in a manner such that, when exposed to a hydrogen and oxygen feed mixture, hydrogen peroxide formation occurs much more rapidly at the inner electrode than at the outer electrode. As indicated above, hydrogen and oxygen are consumed at the inner electrode to ultimately produce water. The consumption of hydrogen and oxygen at the inner electrode creates a pressure differential between the electrodes so that hydrogen and oxygen are caused to diffuse through the electrolyte layer from the outer electrode to the inner electrode. Given the electrolyte materials used heretofore, however, the hydrogen component of the feed mixture diffuses through the electrolyte layer more rapidly than does the oxygen component of the feed mixture. Thus, the mixed hydrogen/oxygen device operates in a manner such that the oxygen partial pressure existing at the outer electrode is much greater than the oxygen partial pressure existing at the inner electrode. Consequently, a relatively large amount of oxygen sorbs onto the surface of the outer electrode while a relatively small amount of oxygen sorbs onto the surface of the inner electrode. Since the presence of sorbed oxygen operates to inhibit the formation of hydrogen peroxide, hydrogen peroxide formation occurs much more rapidly at the inner electrode than at the outer electrode.

When the $H_2/O_2$ feed mixture discussed above is replaced with a methanol/oxygen feed mixture, some mixed fuel/oxygen devices (e.g., the platinum outer electrode devices of U.S. Pat. No. 4,816,813) will undergo a polarity reversal (i.e., the outer electrode will become the positively charged electrode and the inner electrode will become the negatively charged electrode). Platinum is know to catalyze the decomposition of methanol. Methanol decomposes to form hydrogen, which is utilized in reactions (1)-(3) discussed above, and carbon monoxide. Unfortunately, carbon monoxide inhibits the catalytic formation of $H_2O_2$ even more strongly than does sorbed oxygen. Since the concentration of carbon monoxide in the bulk gas (i.e., the feed gas contacting the outer surface of the outer electrode) is essentially zero, a much higher carbon monoxide partial pressure is caused to exist at the inner electrode than exists at the outer surface of the outer electrode. The relatively high carbon monoxide partial pressure existing at the inner electrode inhibits $H_2O_2$ formation at the inner electrode to such a degree that $H_2O_2$ formation now occurs more rapidly at the outer electrode than at the inner electrode. Consequently, a polarity reversal occurs.

In one aspect, the novel mixed fuel/oxygen devices of the present invention provide improved electrical energy output by enhancing the chemical and/or electrochemical processes which cause such devices to operate. For example, the inventive devices operate to enhance the formation of hydrogen peroxide at or near the electron receiving electrode through: (a) the use of an electrode material which is also a highly active catalyst for the formation of hydrogen peroxide; (b) the use of a promoter material which promotes the catalytic formation of $H_2O_2$ at the surface of the electron receiving electrode; and/or (c) the incorporation of a separate catalytic means which catalyzes the production of $H_2O_2$ near the electron receiving electrode. The inventive devices also preferably operate to minimize hydrogen peroxide formation at the electron producing electrode. Hydrogen peroxide formation at the electron producing electrode can be minimized, for example, by the use of a hydrogen peroxide formation inhibitor material and/or the use of an electrode material which is not a highly active catalyst for the formation of hydrogen peroxide. The inventive devices are also preferably constructed in a manner which enhances the actual electrochemical reactions occurring therein.

Examples of electrode materials which are generally suitable for use in the inventive devices include: Group VIII metals such as ruthenium, osmium, rhodium, iridium, palladium, and platinum; rhenium; Group IB metals such as silver and gold; Group VIII metal, rhenium, and/or Group IB metal alloys; and nonmetallic electrically conducting mixed oxides having spinel or perovskite structures. The electrodes of the inventive devices are preferably composed of palladium and/or platinum.

As indicated above, hydrogen peroxide formation at the electron receiving electrode can be enhanced through the use of an electrode material which is also a "highly active" catalyst for the formation of $H_2O_2$ from $H_2$ and $O_2$. Preferred electrode materials which are highly active for the formation of $H_2O_2$ are palladium/platinum compositions (i.e., palladium/platinum alloys or other combinations of palladium and platinum) of the type disclosed in U.S. Pat. No. 4,832,938 wherein platinum is present in an amount in the range of from about 0.5% to about 60% by weight based on the total weight amount of palladium and platinum present in the composition. These electrode materials are also highly active for the electrochemical reduction of $H_2O_2$. More preferred electrode materials which are highly active for the formation of $H_2O_2$ are palladium/platinum compositions of the type disclosed in U.S. Pat. No. 4,832,938 wherein platinum is present in an amount in the range of from about 1% to about 50% by weight based on the total weight amount of palladium and platinum present in the composition. The highly $H_2O_2$ formation-active electrode materials most preferred for use in the present invention are palladium/platinum compositions of the type disclosed in U.S. Pat. No. 4,832,938 wherein platinum is present in an amount in the range of from about 2% to about 20% by weight based on the total weight amount of palladium and platinum present in the composition. The entire disclosure of U.S. Pat. No. 4,832,938 is incorporated herein by reference.

As used herein and in the claims, the term "catalytic material which is a highly active catalyst for the formation of $H_2O_2$" designates a catalytic material which is at least as catalytically active for the formation of $H_2O_2$ from $H_2$ and $O_2$ as a palladium/platinum composition of the type disclosed in U.S. Pat. No. 4,832,938 wherein platinum is present in an amount in the range of from about 0.5% to about 60% by weight based on the total weight amount of palladium and platinum present in the composition.

As also indicated above, the electrical energy output of a device produced according to the present invention can be further enhanced by constructing the device's electron producing electrode from a material which (1) is a highly active catalyst for the electrochemical decomposition of hydrogen but (2) is not a highly active catalyst for the formation of $H_2O_2$ from $H_2$ and $O_2$. Consequently, the electron producing electrodes of the inventive devices are preferably composed of either platinum or palladium.

Hydrogen peroxide formation promoter materials suitable for use in the inventive devices generally include: alkali metal ion sources (e.g., compounds which provide lithium ions, sodium ions, potassium ions, rubidium ions and/or cesium ions); alkaline earth metal ion sources (e.g., compounds which provide beryllium ions, magnesium ions, calcium ions, strontium ions, and/or barium ions; mineral acids; and polymer bound acids. Examples of specific hydrogen peroxide formation promoters suitable for use in the inventive devices include: carbonates of lithium, sodium, potassium, rubidium, cesium, beryllium, magnesium, calcium, strontium, or barium; chloride or bromide salts of lithium, sodium, potassium, rubidium, cesium, beryllium, magnesium, calcium, strontium, or barium; hydrochloric acid; and phosphoric acid. Each of these materials, when placed adjacent to an electrode which is catalytically active for the formation of hydrogen peroxide from hydrogen and oxygen, will operate to increase the rate at which hydrogen peroxide is formed at the surface of the electrode. Additionally, since these promoter materials are ion-conductive, their use does not adversely affect the internal transfer of hydrogen ions between the electrodes. Potassium chloride, rubidium chloride, cesium chloride, and hydrochloric acid are particularly preferred for use as promoter materials in the inventive devices.

Examples of hydrogen peroxide formation inhibitors suitable for use in the inventive devices include: amines such as ethanolamine, triphenyl amine, and like compounds; thiophenol; and triphenyl arsenite. Preferably, the hydrogen peroxide formation inhibitor consists of an immobilized amine attached to a polymeric support.

As indicated above, the devices of the present invention produce electrical energy when contacted with mixtures of oxygen (i.e., relatively pure oxygen, air, or a similar free oxygen source) and fuel (i.e., hydrogen and/or a hydrogen yielding fuel such as methanol). The feed mixture can be supplied to the inventive devices in gas, liquid, or solution form. Feed mixtures composed entirely of molecular oxygen and molecular hydrogen provide optimum electrical energy output. If an oxygen/hydrogen-yielding fuel feed mixture is used, the device must be constructed in a manner such that the hydrogen-yielding fuel is caused to decompose within the device. Decomposition of the hydrogen-yielding fuel provides the molecular hydrogen necessary for reactions (1)–(3) described hereinabove. As indicated above, hydrogen-yielding fuel decomposition can be accomplished within the device through the use of an electrode material which catalyzes the decomposition of said fuel. Alternatively, a permeable layer of decomposition promoter material can be provided adjacent to one of the device's electrodes.

FIG. 1 illustrates one embodiment of the present invention. The device 2 shown in FIG. 1 has an outer electrode 4, an inner electrode 6, and an electrolyte layer 8 disposed between electrodes 4 and 6. In operation, outer electrode 4 is contacted with a oxygen/fuel feed mixture of the type described above. Outer electrode 4 and electrolyte layer 8 are permeable to the oxygen/fuel mixture. Electrolyte layer 8 is also electron insulating and ion conducting. Preferably, inner electrode 6 is impermeable to the oxygen/fuel mixture and to the chemical and electrochemical reaction products thereof. During operation, electrons are conducted from one electrode to the other electrode via external circuit 10 which is connected between electrodes 4 and 6. The resulting electrical current is utilized in utilizing device 12 disposed within external circuit 10.

The preferred construction of device 2 is determined in part by the composition of the fuel/oxygen mixture with which device 2 is to be contacted. If a hydrogen/oxygen feed mixture is used and each of the electrodes of device 2 is composed of platinum and/or palladium, the cathode (i.e., the electron receiving electrode) of device 2 will be inner electrode 6 and the anode (i.e., the electron supplying electrode) of device 2 will be outer electrode 4. If the hydrogen/oxygen feed mixture is replaced with a methanol/oxygen feed mixture, however, the cathode of device 2 will be outer electrode 4 and the anode of device 2 will be inner electrode 6. Preferably, the cathodic electrode of device 2 is composed of a material, as discussed above, which is a highly active catalyst for both the chemical formation and the electrochemical reduction of hydrogen peroxide. On the other hand, the anode of device 2 is preferably composed of a material, as also discussed above, which is (1) a highly active catalyst for the electrochemical production of electrons and hydrogen ions but (2) is not a highly active catalyst for the chemical formation of hydrogen peroxide.

Additionally, if an oxygen/hydrogen-yielding fuel feed mixture is used, at least one of the electrodes of device 2 is preferably composed of a material which catalytically promotes the decomposition of the hydrogen-yielding fuel. For example, if an oxygen/methanol feed mixture is used, inner electrode 6 (i.e., the anodic electrode of device 2) is preferably composed of a material which (1) is highly active for the electrochemical decomposition of hydrogen but (2) is not highly active for the formation of $H_2O_2$ while outer electrode 4 (i.e., the cathodic electrode of device 2) is preferably composed of a material which (1) catalyzes the decomposition of methanol and (2) is a highly active catalyst for the chemical formation and the electrochemical reduction of $H_2O_2$. Consequently, given an oxygen/methanol feed mixture, inner electrode 6 of device 2 is preferably composed of either platinum or palladium and outer electrode 4 is preferably composed of a highly $H_2O_2$ formation-active platinum/palladium composition of the type described hereinabove.

Impermeable inner electrode 6 can be formed using methods which are well known in the art. Electrode 6 is preferably formed using conventional fabrication techniques known in the art for producing integrated circuits and thin film devices. For example, electrode 6 can be formed by sputtering a layer of metallic electrode material on a suitable insulating substrate (e.g., glass, quartz, etc.) (not shown). In order to obtain an impermeable electrode, the electrode material should be sputtered to a thickness exceeding about 50 nm.

Electrolyte materials suitable for use in the inventive devices can be solid or liquid and should be electron insulating, ion conducting, and permeable to the fuel (i.e., hydrogen and/or hydrogen-yielding fuel), oxygen and reaction products thereof. The electrolyte material preferably has a resistivity of at least $10^6$ ohm-centimeters. Examples of suitable solid electrolyte materials include: hydrated aluminum oxide, preferably containing at least 50% by weight pseudoboehmite and most preferably containing at least 95% by weight pseudoboehmite; and carbon-containing polymeric electrolytes (e.g., polyacrylic acid electrolyte materials). Methods of producing suitable solid electrolytes and methods for forming electrolyte layer 8 on inner electrode 6 are disclosed, for example, in U.S. Pat. No. 4,863,813, the entire disclosure of which is incorporated herein by reference.

The fuel and oxygen diffusion characteristics of a given electrolyte, and the ability of the electrolyte to provide desirable fuel and oxygen concentration ratios at the inner and outer electrodes, can be improved through the simultaneous optimization of (a) the thickness of electrolyte layer, (b) the porosity of the electrolyte layer, (c) the distribution of pore diameters within the electrolyte layer, (d) the prevalence of acidic sites within the electrolyte layer, and (e) the strength of these acidic sites. The simultaneous optimization of these variables can be achieved, for example, using routine statistically designed experimentation methods.

Permeable outer electrode 4 can be formed on electrolyte layer 8 using the methods disclosed in U.S. Pat. No. 4,863,813, the entire disclosure of which has been incorporated herein by reference. For example, outer electrode 4 can be deposited on electrolyte layer 8 using the sputtering method described above. However, outer electrode 4 should be sputtered to a thickness of less than about 50 nm. At a sputtered thickness of less than about 50 nm, the electrode should contain a sufficient number of pinholes to render the electrode permeable to the fuel and oxygen. Alternatively, as also described in U.S. Pat. No. 4,863,813, permeable outer electrode 4 can consist of a solid electrolyte layer which is patterned with an array of apertures.

Figure 2:
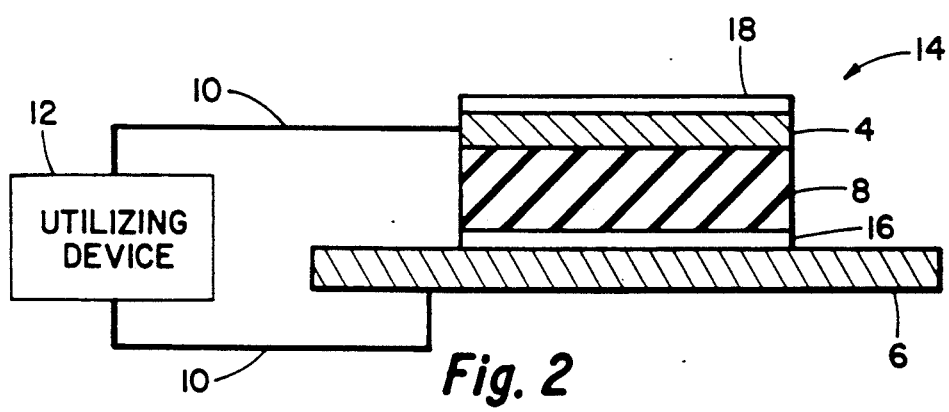
FIG. 2 is a diagram of a second embodiment of the device of the present invention. Device 14 of FIG. 2 incorporates a layer, 16 or 18, of $H_2O_2$ formation promoter material at one electrode and a layer, 16 or 18, of $H_2O_2$ formation inhibitor material at the other electrode.

FIG. 2 illustrates a second embodiment of the present invention. Device 14 of FIG. 2 incorporates layers, 16 and 18, of $H_2O_2$ formation promoter material and $H_2O_2$ formation inhibitor material. When inner electrode 6 is the electron receiving electrode of device 14, layer 16 constitutes a layer of $H_2O_2$ formation promoter material and layer 18 constitutes a layer of $H_2O_2$ formation inhibitor material. When outer electrode 4 is the electron receiving electrode of device 14, layer 18 constitutes a layer of $H_2O_2$ formation promoter material and layer 16 constitutes a layer of $H_2O_2$ formation inhibitor material.

Layers 16 and 18 can be thin permeable films of promoter material and inhibitor material which are deposited on electrodes 6 and 4. Suitable deposition methods include: sputtering; sublimation; solution application followed by solvent evaporation; the deposition and subsequent polymerization of reactive monomers; and similar deposition methods. Alternatively, inner layer 16 can be a layer of electrolyte material which contains either a promoter material or an inhibitor material. For example, the promoter or inhibitor material can be sorbed onto the stationary phase of the electrolyte material or dissolved in the continuous phase of the electrolyte material. Suitable combined electrolyte/promoter or electrolyte/inhibitor layers can be formed, for example, by sublimation or solution deposition.

The cathode of device 14 is preferably composed of an electrode material, as discussed above, which is a highly active catalyst for both the chemical formation and the electrochemical reduction of $H_2O_2$. Further, the anode of device 14 is preferably composed of an electrode material, as discussed above, which (1) is a highly active catalyst for the electrochemical production of protons and electrons but (2) is not a highly active catalyst for the chemical formation of $H_2O_2$.

Figure 3:
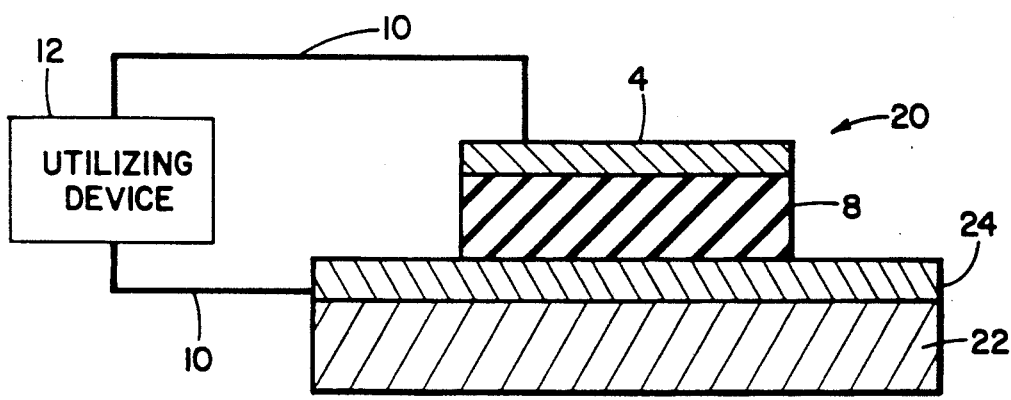
FIG. 3 is a diagram of a third embodiment of the device of the present invention. Device 20 of FIG. 3 incorporates a catalytic means 22 adjacent to electrode 24.

FIG. 3 illustrates a third embodiment of the present invention. Device 20 of FIG. 3 operates to individually enhance the hydrogen peroxide formation and hydrogen peroxide reduction reactions occurring therein. Device 20 differs from inventive device 2 in that the functions of the inner electrode, which is the electron receiving electrode of device 20, are divided between a permeable inner electrode 24 and a permeable catalytic layer 22. Permeable inner electrode 24 is preferably positioned between catalytic layer 22 and electrolyte layer 8 so that the catalytic layer 22 does not interfere with the flow of ions from outer electrode 4 to inner electrode 24.

In operation, fuel and oxidizer pass through permeable inner electrode 24 and react in permeable catalytic layer 22 to form hydrogen peroxide. The hydrogen peroxide then reacts electrochemically with electrons and hydrogen ions at permeable inner electrode 24. Since the inner electrode 24 of device 20 is designed for optimum cathodic operation, device 20 is preferably used to produce electrical energy from feed mixtures consisting essentially of oxygen (e.g. pure oxygen, air, or a similar free oxygen source) and hydrogen.

Permeable inner electrode 24 is composed of a material which is catalytically active for the electrochemical reduction of hydrogen peroxide. Preferably, electrode 24 is composed of palladium; platinum; or a combination thereof.

Permeable catalytic layer 22 is preferably composed of small catalyst particles dispersed in a permeable inert material. The catalyst used in layer 22 is preferably a catalyst which is highly active for the formation of $H_2O_2$ from $H_2$ and $O_2$. Thus, the catalyst used in layer 22 is preferably a palladium/platinum composition of the type discussed hereinabove wherein platinum is present in an amount in the range of from about 0.5% to about 60% by weight, more preferably 1% to about 50% by weight, and most preferably 2% to 20% by weight, based on the total weight amount of platinum and palladium present in the palladium/platinum composition. Examples of permeable inert materials suitable for use in the formation of permeable catalytic layer 22 include silica gel, quartz, gamma alumina, alpha alumina, silicon carbide, graphite, zeolite, zirconia, and titania.

Permeable catalytic layer 22 can be formed, for example, by sequentially depositing permeable inert material and catalyst material on an impermeable, insulating substrate (e.g., a substrate composed of glass, quartz, etc.) (not shown). Alternatively, preformed particles of permeable inert material loaded with catalyst can be deposited on an impermeable, inert substrate. Deposition techniques suitable for use in these methods include: sputtering; deposition from solution by evaporation of solvent; deposition from a slurry by evaporation of the carrier fluid; and like techniques. Permeable electrode 24 can be formed on catalytic layer 22 by the same methods used to form permeable outer electrode 4.

The following examples are provided in order to further illustrate the present invention.

EXAMPLE I

A mixed fuel/oxygen fuel cell device of the type currently used in the art is formed according to the procedure set forth below. The device has an impermeable inner electrode, a permeable outer electrode, and a layer of permeable solid electrolyte disposed between the inner electrode and the outer electrode. The impermeable inner electrode is formed by sputtering platinum on an impermeable quartz substrate to a thickness of approximately 50 nm. Next, a layer of pseudoboehmite is deposited on the inner electrode by: (1) sputtering an approximately 30 nm thick layer of aluminum onto the electrode surface; (2) hydrothermally converting the aluminum film to pseudoboehmite by exposure to boiling deionized water; and (3) repeating these steps until a total pseudoboehmite layer thickness of approximately 500 nm is achieved. Finally, the permeable outer electrode is formed by sputtering a thin layer of platinum onto the pseudoboehmite.

The prior art device is tested in a gas-containing chamber which allows control of gas temperature and composition. The outer electrode of the device is exposed to various oxygen/hydrogen feed mixtures having oxygen:hydrogen mole ratios ranging from 1:100 to 100:1. These tests are conducted at gas temperatures ranging from 5° C. to 95° C. and pressures ranging from 0.01 psia to 50 psia.

Given the hydrogen/oxygen feed compositions and operating conditions described above, the prior art device produces electrical currents of up to 3 mA/cm$^2$ at up to about 0.95 volts. The device typically provides a stable electrical output of about 1 mA/cm$^2$ at 0.6 volts. During these hydrogen/oxygen feed mixture tests, the inner electrode of the device is electrically positive relative to the device's outer electrode.

Next, the prior art device is exposed to a methanol vapor and air feed mixture. The feed mixture has an oxygen partial pressure of 5.6 psia and a methanol vapor partial pressure of 14.4 psia.

When exposed to the oxygen/methanol feed mixture just described, the prior art device produces an electrical current of about 0.025 mA/cm$^2$ at about 100 mv. When exposed to the oxygen/methanol feed mixture, the outer electrode of the device is electrically positive relative to the device's inner electrode.

EXAMPLE II

A second fuel cell (inventive device (a)) is fabricated according to the procedures set forth in Example I. However, the inner electrode of device (a) is formed by sputtering a platinum/palladium composition of the type disclosed in U.S. Pat. No. 4,832,938 onto an impermeable quartz substrate. The platinum/palladium composition is sputtered to a thickness of about 50 nm. The platinum/palladium composition contains 10 parts by weight platinum and 90 parts by weight palladium.

Device (a) is exposed to the same hydrogen/oxygen feed mixtures and test conditions described in Example I. During these tests, device (a) provides electrical currents significantly exceeding 3 mA/cm$^2$ at more than 0.95 volts. Device (a) typically provides a stable electrical output significantly exceeding 1 mA/cm$^2$ at more than 0.6 volts. When exposed to the hydrogen/oxygen feed mixtures used in this test, the inner electrode of device (a) is electrically positive relative to the outer electrode.

EXAMPLE III

A third fuel cell (inventive device (b)) is fabricated according to the procedures set forth in Example I. However, the inner electrode of device (b) is composed of solid platinum while the outer electrode of device (b) consists of the same platinum/palladium composition used in Example II.

Device (b) is exposed to a methanol/oxygen fuel mixture which is identical to the methanol/oxygen mixture described in Example I. During the test, device (b) provides an electrical current significantly exceeding 0.025 mA/cm$^2$ at more than 100 mv. When exposed to the methanol/oxygen feed mixture, the outer electrode of device (b) is electrically positive relative to the device's inner electrode.

Thus, the present invention is well adapted to carry out the objects and attain the ends and advantages mentioned above as well as those inherent therein. While presently preferred embodiments have been described for purposes of this disclosure, numerous changes will be apparent to those skilled in the art. Such changes are encompassed within the spirit of this invention as defined by the appended claims.

I claim:

1. A device for producing electrical current from a mixture of oxygen and fuel, said fuel being selected from hydrogen, a hydrogen-yielding fuel, or a mixture thereof, comprising:

a first electrode means for receiving electrons, said first electrode means comprising a catalytic material which is a highly active catalyst for the formation of $H_2O_2$ from $H_2$ and $O_2$;

a second electrode means for supplying electrons, said second electrode means being less catalytically active than said first electrode means for the formation of $H_2O_2$ from H: and $O_2$; and an electrolytic diffusion means, between said first electrode means and said second electrode means, for conducting ions from one of said electrode means to the other of said electrode means and for conducting oxygen and hydrogen-yielding fuel, oxygen and hydrogen, or oxygen and a combination of hydrogen-yielding fuel and hydrogen from one of said electrode means to the other of said electrode means, wherein at least one of said electrode means is permeable.

2. The device of claim 1 wherein said catalytic material comprises platinum and palladium with said platinum being present in said catalytic material in an amount in the range of from about 0.5% to about 60% by weight based on the total weight of said platinum and palladium present in said catalytic material.

3. The device of claim 2 wherein said platinum is present in said catalytic material in an amount in the range of from about 1% to about 50% by weight based on the total weight of said platinum and palladium present in said catalytic material.

4. The device of claim 2 wherein said platinum is present in said catalytic material in an amount in the range of from about 2% to about 20% by weight based on the total weight of said platinum and palladium present in said catalytic material.

5. The device of claim 2 wherein said second electrode means is an electrode consisting essentially of platinum or palladium.

6. The device of claim 1 wherein said first electrode means comprises:
an electrode comprised of said catalytic material and
a layer of promoter material adjacent to said electrode, said promoter material being a promoter of the catalytic formation of $H_2O_2$ from $H_2$ and $O_2$.

7. The device of claim 1 wherein said first electrode means comprises:
an electrode and
a catalytic means, adjacent to said electrode, for catalyzing the formation of $H_2O_2$ from $H_2$ and $O_2$, said catalytic means comprising said catalytic material.

8. The device of claim 1 wherein said second electrode means comprises:
an electrode and
a layer of inhibitor material adjacent to said electrode, said inhibitor material being an inhibitor of the formation of $H_2O_2$.

9. A device for producing electrical current from a mixture of oxygen and fuel, said fuel being selected from hydrogen, a hydrogen-yielding fuel, or a mixture thereof, comprising:
a first electrode;
a second electrode;
an electrolytic diffusion means, between said first electrode and said second electrode, for conducting ions from one of said electrodes to the other of said electrodes and for conducting oxygen and hydrogen-yielding fuel, oxygen and hydrogen, or oxygen and a combination of hydrogen-yielding fuel and hydrogen from one of said electrodes to the other of said electrodes; and
a layer of a promoter material adjacent to said second electrode, said promoter material being a promoter of the formation of $H_2O_2$ from $H_2$ and $O_2$,
wherein at least one of said electrodes is permeable.

10. The device of claim 9 wherein said layer of promoter material comprises said promoter material deposited on one surface of said second electrode.

11. The device of claim 9 wherein said layer of promoter material comprises said promoter material dispersed in electrolyte.

12. The device of claim 9 wherein said promoter material is selected from: carbonates, chloride salts, or bromide salts of lithium, sodium, potassium, rubidium, cesium, beryllium, magnesium, calcium, strontium, or barium; hydrochloric acid; or phosphoric acid.

13. The device of claim 9 wherein said second electrode is more catalytically active than said first electrode for the formation of $H_2O_2$ from $H_2$ and $O_2$.

14. The device of claim 9 wherein said second electrode is comprised of a catalytic material which is a highly active catalyst for the formation of $H_2O_2$ from $H_2$ and $O_2$.

15. The device of claim 14 wherein said catalytic material comprises platinum and palladium with said platinum being present in said catalytic material in an amount in the range of from about 0.5% to about 60% by weight based on the total weight of said platinum and palladium present in said catalytic material.

16. The device of claim 15 wherein said platinum is present in said catalytic material in an amount in the range of from about 1% to about 50% by weight based on the total weight of said platinum and palladium present in said catalytic material.

17. The device of claim 15 wherein said platinum is present in said catalytic material in an amount in the range of from about 2% to about 20% by weight based on the total weight of said platinum and palladium present in said catalytic material.

18. The device of claim 9 further comprising a layer of an inhibitor material adjacent to said first electrode, said inhibitor material being an inhibitor of the formation of $H_2O_2$.

19. The device of claim 18 wherein said inhibitor material is selected from: ethanolamine; triphenyl amine; thiophenol; or triphenyl arsenite.

20. A device for producing electrical current from a mixture of oxygen and fuel, said fuel being selected from hydrogen, a hydrogen-yielding fuel, or a mixture thereof, comprising:
a permeable first electrode;
a second electrode having a first surface and a second surface;
an electrolytic diffusion means, between said first electrode and said first surface of said second electrode, for conducting ions from one of said electrodes to the other of said electrodes and for conducting oxygen and hydrogen-yielding fuel, oxygen and hydrogen, or oxygen and a combination of hydrogen-yielding fuel and hydrogen from one of said electrodes to the other of said electrodes; and
a catalytic means, adjacent to one of said surfaces of said second electrode, for catalyzing the formation of $H_2O_2$ from $H_2$ and $O_2$.

21. The device of claim 20 wherein said second electrode is permeable and said catalytic means is adjacent to said second surface of said second electrode.

22. The device of claim 20 wherein said catalytic means comprises a layer of a permeable inert material having dispersed therein a catalytic material for catalyzing the formation of $H_2O_2$ from $H_2$ and $O_2$.

23. The device of claim 22 wherein said catalytic material comprises platinum and palladium with said platinum being present in said catalytic material in an amount in the range of from about 0.5% to about 60% by weight based on the total weight of said platinum and palladium present in said catalytic material.

24. The device of claim 23 wherein said platinum is present in said catalytic material in an amount in the range of from about 1% to about 50% by weight based on the total weight of said platinum and palladium present in said catalytic material.

25. The device of claim 23 wherein said platinum is present in said catalytic material in an amount in the range of from about 2% to about 20% by weight based on the total weight of said platinum and palladium present in said catalytic material.

26. The device of claim 22 wherein said permeable inert material is selected from: silica gel; quartz; gamma alumina; alpha alumina; silicon carbide; graphite; zeolite; zirconia; titania; or a combination thereof.

* * * * *